United States Patent [19]

Heitzmann

[11] Patent Number: 5,238,210
[45] Date of Patent: Aug. 24, 1993

[54] OUTER SPACE SOLAR ENERGY COLLECTION SYSTEM

[76] Inventor: Albert K. Heitzmann, 42 W. Medlock Dr., Phoenix, Ariz. 85013

[21] Appl. No.: 880,671

[22] Filed: May 8, 1992

[51] Int. Cl.$^5$ .............................. B64G 1/10; F24J 2/18; G02B 5/10; G02B 17/00
[52] U.S. Cl. .............................. 244/158 R; 126/683; 126/685; 359/627; 359/641; 359/730; 359/850
[58] Field of Search .................... 244/158 R, 159, 173; 126/438, 439, 683, 684, 685, 698; 136/246; 359/619, 627, 641, 729, 730, 731, 850, 855

[56] References Cited

U.S. PATENT DOCUMENTS

| | | | |
|---|---|---|---|
| 3,564,253 | 2/1971 | Buckingham | 244/158 R |
| 4,305,555 | 12/1981 | Davis | 244/158 R |
| 4,402,306 | 9/1983 | McElroy | 126/439 X |
| 4,947,825 | 8/1990 | Moriarty | 126/439 |

FOREIGN PATENT DOCUMENTS 2508248 12/1982 France ............................ 244/173

OTHER PUBLICATIONS

Muller, Ronald M. "In Orbit Manufacture of Solar Reflector Satellites", *The Industrialization of Space*, vol. 36, Part 1, Proceedings of the 23rd AAS Annual Meeting, Oct. 18–20, 1987, San Francisco, Calif. pp. 415–428.

Primary Examiner—Bruce Y. Arnold
Assistant Examiner—David R. Parsons
Attorney, Agent, or Firm—Tod R. Nissle

[57] ABSTRACT

A system for collecting solar energy includes a space station which receives and concentrates solar light and produces a plurality of collimated beams each diverging toward a common axis and toward a target area on the surface of the earth. On reaching the target area on the earth, each of the collimated beams is superimposed on the other.

2 Claims, 3 Drawing Sheets

OUTER SPACE SOLAR ENERGY COLLECTION SYSTEM

BACKGROUND OF THE INVENTION

1. Field of the Invention

This invention relates to systems for collecting solar energy.

More particularly, the invention relates to a system for collecting solar energy in outer space and directing the solar energy to a selected area on the surface of the earth.

In another respect, the invention relates to a solar light collection system of the type described which, during transmission of the solar light from outer space to the earth, minimizes the divergence of the solar light which occurs when the solar light travels from outer space to the surface of the earth.

In a further respect, the invention relates to a solar light collection system of the type described which reduces the proportion of infrared energy contained in solar energy transmitted from outer space to the earth.

2. Description of Related Art

Systems for collecting solar energy in outer space and directing the solar energy to the earth have been proposed. Such systems have significant disadvantages. First, the systems require equipment which has excessive mass densities approaching or exceeding one kilogram per square meter. Boosting such mass densities into outer space is cost prohibitive. Second, the prior art systems have, because of the complexity of the systems, presumed that a continuous manned presence in space would be required to operate the systems.

In order to be profitable, and feasible, a space-based solar energy collection system must be lightweight and simple in design. The mass density of the system preferably should be about fifty grams per square meter. The structure of the system should make assembly of the system simple.

A system based on mirrors which reflect sunlight from outer space to the earth's surface would be simple. If, however, a simple flat mirror is, for example, placed in a geosynchronous orbit to reflect sunlight to the earth's surface, the sunlight reflected from the mirror travels a distance of about 35,000 kilometers to the earth's surface. This, due to the divergence of the light as it traveled from the mirror to the earth, results in the formation on the earth's surface of an image of the sun which is at least 335 kilometers in diameter. The formation on the earth's surface of an image at least 335 kilometers in diameter occurs regardless of the size of mirror used.

Accordingly, it would be highly desirable to provide a lightweight solar collector which could be easily assembled in orbit about the earth and which would compensate for the natural divergence of light to cause light transmitted from the solar collector to arrive at a relatively small area on the earth's surface.

Therefore, it is a principal object of the invention to provide an improved system for collecting solar light.

A further object of the invention is to provide an improved system for collecting solar energy in outer space and transmitting the solar energy to the earth.

Another object of the invention is to provide an improved outer space solar collector which minimizes the divergence of solar energy transmitted to the surface of the earth.

Still a further object of the invention is to provide an outer space solar collector of the type described which can utilize reflectors of varying shape and dimension.

Yet still a further object of the invention is to provide an outer space solar collector which transmits solar energy to a selected target area on the earth and reduces the proportion of infrared radiation contained in the solar energy received in the selected target area.

BRIEF DESCRIPTION OF THE DRAWINGS

These and other, further and more specific objects and advantages of the invention will be apparent to those skilled in the art from the following detailed description thereof, taken in conjunction with the drawings, in which.

SUMMARY OF THE INVENTION

Briefly, in accordance with my invention, I provide a system for collecting solar energy from outer space. The system includes a space station and collector means in a selected area on the surface of the earth. The space station includes a concave arcuate surface for receiving and reflecting solar light in converging paths of travel toward a focal area; and, means for receiving the reflected solar light from the concave arcuate surface and directing diverging collimated beams of solar light toward the selected area on the surface of the earth. The receiving means includes a secondary reflective surface to receive the reflected solar light from the concave arcuate surface. The secondary reflective surface includes a plurality of reflective members. Each of the reflective members is shaped and dimensioned and positioned such that a portion of the reflected solar light from the concave arcuate surface is reflected from the reflective member in a collimated beam directed toward the selected area on the surface of the earth. As the light reflected from the secondary reflective surface travels toward the earth, the light from each reflective member overlaps and is at least partially superimposed on the light from at least one other reflective member.

DESCRIPTION OF THE PREFERRED EMBODIMENTS

Figure 1:
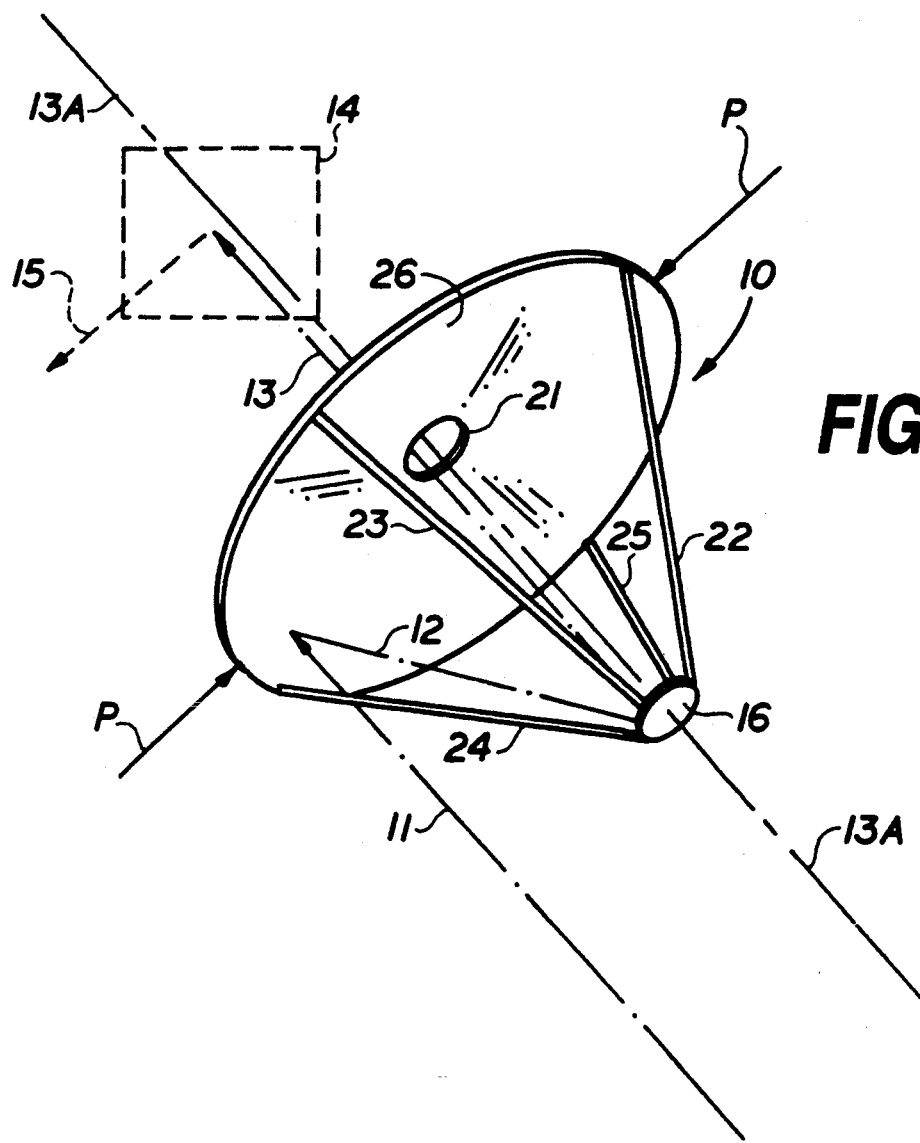
FIG. 1 is a perspective view of a space station constructed in accordance with the principles of the invention.

Turning now to the drawings, which depict the presently preferred embodiments of the invention for the purpose of illustrating the practice thereof, and in which like reference characters refer to corresponding elements throughout the several views, FIG. 1 illustrates a space station constructed in accordance with the invention and including a primary reflector or dish 10 having a concave arcuate light reflective surface 26 for receiving solar energy 11 and reflecting at least the visible light component of the solar energy in converging paths 12 of travel toward a focal area. The visible light component of solar energy comprises the wavelengths of light normally visible to the human eye. Secondary reflector or member 16 is positioned in the focal area of dish 10 and includes a plurality of reflective members or mirrors or surfaces 17, 18, 19, 20, etc. each shaped and dimensioned and positioned such that each reflective member 17 to 20, etc. receives and reflects in a collimated beam a portion of the reflected visible solar light 12 from the concave arcuate reflective surface 26. The reflected collimated beam produced by each of the members 17 to 20 has a path of travel which is in the same general direction as the direction of travel indicated by arrow 13 in FIG. 1 but which also gradually diverges toward an axis or centerline 13A which is parallel to arrow 13 and extends from the space station to the earth and through the center of a target area on the surface of the earth. Axis 13A passes through the center of dish 10 and of circular member 16. As the collimated beams of solar energy travel in the direction of arrow 13 toward the earth, the beams from each member 17 to 20 diverge, overlap and are superimposed on one another. The reflected collimated beam from one member 17 to 20 strikes the surface of the earth completely within a designated target area. The target area is at a selected longitude and latitude on the surface of the earth and has a selected shape and dimension. The reflected collimated beam from said one of members 17 to 20 generally completely fills and "lights" the target area. The reflected beam from each of the remaining ones of members 17 to 20 also generally completely fills and does not extend outside of the selected target area. In other words, each reflective member 17 to 20 is shaped and dimensioned and positioned on member 16 such that the collimated beam of light produced by the member is directed and aimed toward the selected target area and diverges to illuminate and "fill" the target area. Each member 17 to 20 on member 16 ordinarily has a different orientation than the other remaining members because the beam of light produced by each member travels at a slightly different angle and direction than the beams produced by the remaining members 17 to 20. The reflected light from each member 17 to 20 which strikes the target area on the earth's surface is generally completely superimposed over or "mixed" with the light reflected from each of the remaining members 17 to 20. Such superimposition of the reflected light from each member 17 to 20 tends to destroy and prevent the transmission of an image by the light. The intention, however, of the invention is to superimpose, concentrate, and minimize the divergence of the solar light and is not to produce an optical image on the surface of the earth. Whether an image is formed by the time the light reaches the surface of the earth is of no concern. Solar light 13 reflected from members 17 to 20 passes through aperture 21 formed in dish 10.

Primary dish 10 is preferably constructed from a thin sheet of lightweight material, like mylar, which is provided with a silver coating, aluminum coating, or coating of another light reflective material. A skeletal support structure (not shown) akin to that of an umbrella can be used to tension and support the back convex surface of dish 10. Or, the dish can be segmented into pie shapes which are each individually tensioned and then placed adjacent one another to form arcuate circular surface 26. Or, as would be appreciated by those of skill in the art, any of a wide variety of structural support systems can be utilized or devised to construct dish 10. However, fabricating surface 26 from a thin sheet of material enables dish 10 to be lightweight in accordance with the principles of the invention.

In FIG. 1, primary dish 10 is positioned in space such that dish 10 receives solar energy 11 and reflects 12 the energy to member 16 which produces a plurality of diverging collimated beams of solar energy which travel in the general direction of arrow 13 toward a selected target area on the surface of the earth. If desired, primary dish 10 can be positioned in an orientation in which the collimated beams from member 16 do not travel toward the desired designated area on the surface of the earth. In this case, a mirror or mirrors 14 can be utilized to alter the direction of travel of the collimated beams to another direction of travel like that indicated by arrow 15. Light traveling in the direction of arrow 15 would travel directly toward a designated area on the surface of the earth. Dish 10 preferably is oriented to directly face the sun.

The purpose of the reflective members 17 to 20 is to receive light 12 from surface 26 and reflect the light in directions of travel which are in the same general direction of travel as the direction of travel indicated by arrow 13 in FIG. 1 but which also gradually diverge toward the direction of travel indicated by arrow 13 so that the light from each member 17 to 20 strikes the earth within a common selected target area on the surface of the earth. It is preferred, but not necessary, that members 17 to 20 reflect ninety percent or more of the visual light component of the solar energy reflected from surface 26 in a directions of travel. Each light reflective member 17 to 20 can take on any shape and dimension and each member 17 to 20 can be mounted in any orientation on member 16 which will accomplish the collimated reflection of light in directions which are generally equivalent to the direction indicated by arrow 13 and which gradually diverge toward the direction indicated by arrow 13. Some of the light striking a member 17 or 20 will be absorbed or will be reflected in a direction which is not generally equivalent to the direction indicated by arrow 13 and will be lost. Normally, attempts are made to minimize such losses of light.

Member 16 can comprise a sheet of mylar or other lightweight material with reflective members or surfaces 17 to 20 formed on member 16. A structural skeleton akin to that used in an umbrella can be used to tension and support the back of the sheet of mylar. Any other desired means can be used to form a member 16 having a plurality of reflective members 17 to 20. The reflective members or surfaces 17 to 20 can be formed from metal or any other desired light reflective material.

Figure 2:
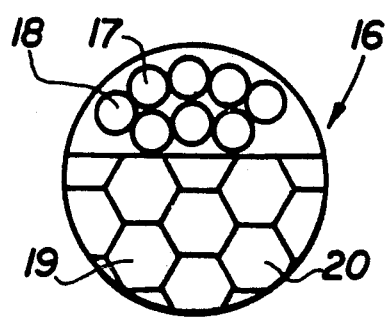
FIG. 2 is a front view of a reflector array utilized in the space station of FIG. 1.
Figure 3:
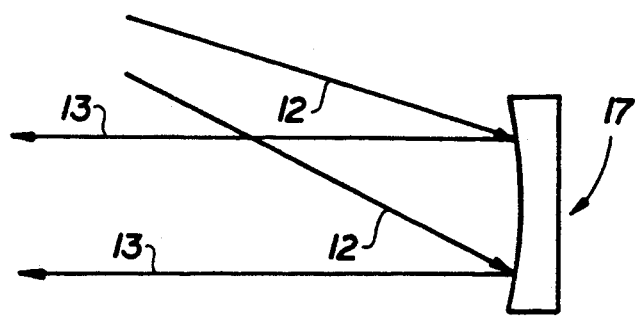
FIG. 3 is a side view illustrating the mode of operation of a reflector utilized on the array of FIG. 2.
Figure 4:
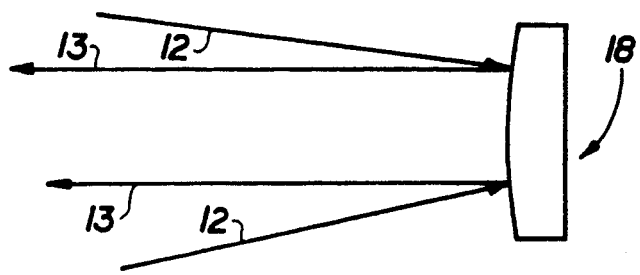
FIG. 4 is a side view illustrating the mode of operation of another reflector utilized on the array of FIG. 2.
Figure 5:
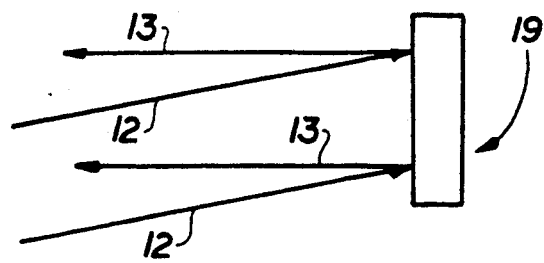
FIG. 5 is a side view illustrating the mode of operation of still another reflector utilized on the array of FIG. 2.

The diameter, P, of primary dish 10 can vary as desired but is presently preferably about one kilometer. The diameter of circular member 16 can vary as desired but is presently preferably about thirteen meters. Similarly, the size of the reflective members 17 to 20 can vary as desired but presently about 320 circular (or hexagonal or some other geometrical shape) reflective members 17 of equal size and dimension extend from side to side of member 16 along the diameter of member 16. Each circular reflective member 17 abuts adjacent members 17 and therefore has a diameter of about 0.04 meters. Although 320 of the 0.04 meter diameter circular members 17 extend along each diameter line of the surface of member 16, the surface of member 16 is completely covered by said 0.04 meter diameter circular members and each of the circular members is positioned on the surface of member 16 such that it receives light from dish 10 and produces a collimated beam of light directed toward a common target area on the surface of the earth. Each of said 0.04 meter diameter circular members abuts other identical members in the manner that members 17 and 18 abut one another in FIG. 2.

As the size of a member 17 to 20 becomes smaller, the efficiency of the member in collimating light decreases. Shorter wavelengths are collimated more efficiently than long wavelengths. When dish 10 has a 1200 meter diameter, member 16 has a sixteen meter diameter, and members 17 to 20 are each about 0.04 meter in diameter:

1. Light having wavelengths of up to about 10,000 Angstroms is collimated and reflected by members 17 to 20. Infrared light having wavelengths in excess of about 10,000 Angstroms in not as efficiently collimated and reflected and is therefore disbursed from the light which is collected and transmitted to the earth by the space station of FIG. 1. Visual light has wavelengths in the range of about 4,000 to 7,000 angstroms.
2. The target area on the surface of the earth which receives the light reflected from reflective members 17 to 20 is about 1200 meters in diameter. The collimated light beam produced by one of the diameter of about 0.04 meters to a diameter of about 1200 meters by the time the light beam reaches the surface of the earth. The light from all of the collimated beams from members 17 to 20 generally strikes the surface of the earth within the 1.2 kilometer diameter target area.
3. The intensity of the light reaching the earth is about 900 watts per square meter, which is comparable to the intensity of light in Phoenix, Ariz. on a sunny summer day. This intensity of light poses no danger to life. Further, since as noted above the proportion of the infrared radiation in the concentration solar energy has been reduced, the light received on the surface of the earth poses even less of a hazard.

As noted above, using unusually small size members 17 to 20 having, for instance, a diameter of less than one centimeter is prevented by the inability of such small size members to effectively collimate many wavelengths of light. If desired, each member 17 to 20 can comprise a collimating lens so that solar light 12 which strikes a member 17 to 20 passes through the lens, is collimated, and produces a beam which gradually diverges toward a selected axis as the beam travels toward the earth. If such collimating lenses were utilized, the light passing through the lenses is traveling in a direction generally opposite the direction indicated by arrow 13 in FIG. 1, in which case the space station of FIG. 1 is oriented such that the light from the collimating lenses travels toward the desired target area on the surface of the earth, or, in which case a mirror(s) is utilized to reflect the collimated light in the desired direction of travel toward the target area on the surface of the earth.

The shape of surface 26 presently approximates the shape of a paraboloid. If the surface 26 were a perfect paraboloid, it would project or reflect an image of the sun (when surface 26 was pointed at the sun) toward a focal point. In use of the invention, surface 26 can deviate from a perfect paraboloid and take on any desired concave arcuate shape. A clear image of the sun is not required. It is only desired that the light 12 reflected from surface 26 converge toward a focal area occupied by member 16. Ordinarily, member 16 will be positioned in the area at which the light 12 reflected from surface 26 is most convergent.

By way of example, the size of the primary dish 10, member 16, and reflective members 17 can be calculated as follows. When a flat mirror is in geosynchronous orbit and the mirror is oriented to reflect sunlight onto the surface of the earth, the width or diameter, D, of the spot on the surface of the earth which is illuminated by the reflected sunlight from the mirror can be determined using the formula $D = S/107$, where S equals the distance of the mirror from the earth. If, for example, S equals 42,000 kilometers, then D equals 392 kilometers. Further, if we wish the width or diameter of the area on the surface of the earth which is illuminated to be only 5 kilometers, then D, which in our flat mirror example is 392 kilometers, is divided by 5 to obtain 78, where 78 equals the number of abutting members 17 which extend along the diameter of circular member 16 in FIG. 1. It is desired that the reflected beam from each member 17 diverge no more than 5/42,000 or $1.20 \times 10^{-4}$ radians. This divergence should be less than 1.22(Lamba/d), where Lamba equals the wavelength of the light being reflected and d equals the diameter of each member 17. If light having a wavelength of one micron is being reflected from each member 17, then Lamba equals $(1.0 \times 10^{-6}$ meters) and we want d to be large enough so that 1.22(Lambda/d) is less than $1.20 \times 10^{-4}$. Therefore d is greater than 1/100 meter or is greater than 1.00 centimeters. The diameter, d, of each member 17 can be increased if desired because as the size of a member 17 increases, the collimating ability of the member 17 improves. Consequently, a member 17 having a diameter of many centimeters collimates visible light very efficiently with little divergence while the reflected light travels from member 17 to the surface of the earth. But, to continue the example, if each of the seventy-eight members 17 lying along the diameter of member 16 is 1.00 centimeters in diameter, then member 16 has a diameter of 0.78 meters and includes about 3,800 members 17 covering the entire circular surface of member 16. The distance, R, from the circular peripheral rim of a parabolic dish 10 to the center of member 16 equals the diameter (0.78 meter) of member 16 multiplied times (cosine phi/sine theta), where sin theta equals (1/107) for the sun and the angle phi is preferably 45 degrees. The angle phi is the rim angle of the dish member 10. Consequently, the distance, R, equals about (0.78 meter) $\times$ (75.7), or, about 59 meters. When the distance, R, is 59 meters and the angle phi is 45 degrees, the diameter of dish 10 is 0.084 kilometer. Since the collimated light reflected from members 17 overlaps to form an illuminated spot on the surface of the earth which has a diameter of about five kilometers, and since the diameter of the primary dish 10 is 0.084 kilometers, then the concentration of sunlight in the five kilometer area on the surface of the earth equals $(0.084/5)^2$ or 1/3500 of the intensity of full sunlight. This makes the intensity of the sunlight too small. If the foregoing calculations are repeated and the size of the illuminated area on the surface of the earth is selected to be 0.5 kilometer instead of five kilometers, then the intensity of the sunlight likely is too great. If, instead, the foregoing calculations are repeated and the size of the illuminated area on the surface of the earth is selected to be 1.0 kilometer instead of five kilometers, then the intensity of the sunlight in the illuminated area is presently, for purposes of safety and of collecting solar energy, about right.

Figure 6:
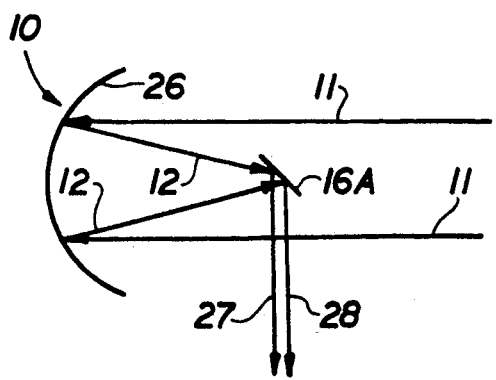
FIG. 6 is a diagram illustrating a space station constructed in accordance with an alternate embodiment of the invention; and, FIG. 7 is a perspective view of a portion of the surface of the earth illustrating the superimposition of beams of solar energy reflected to the earth from the space stations of FIG. 6.
Figure 7:
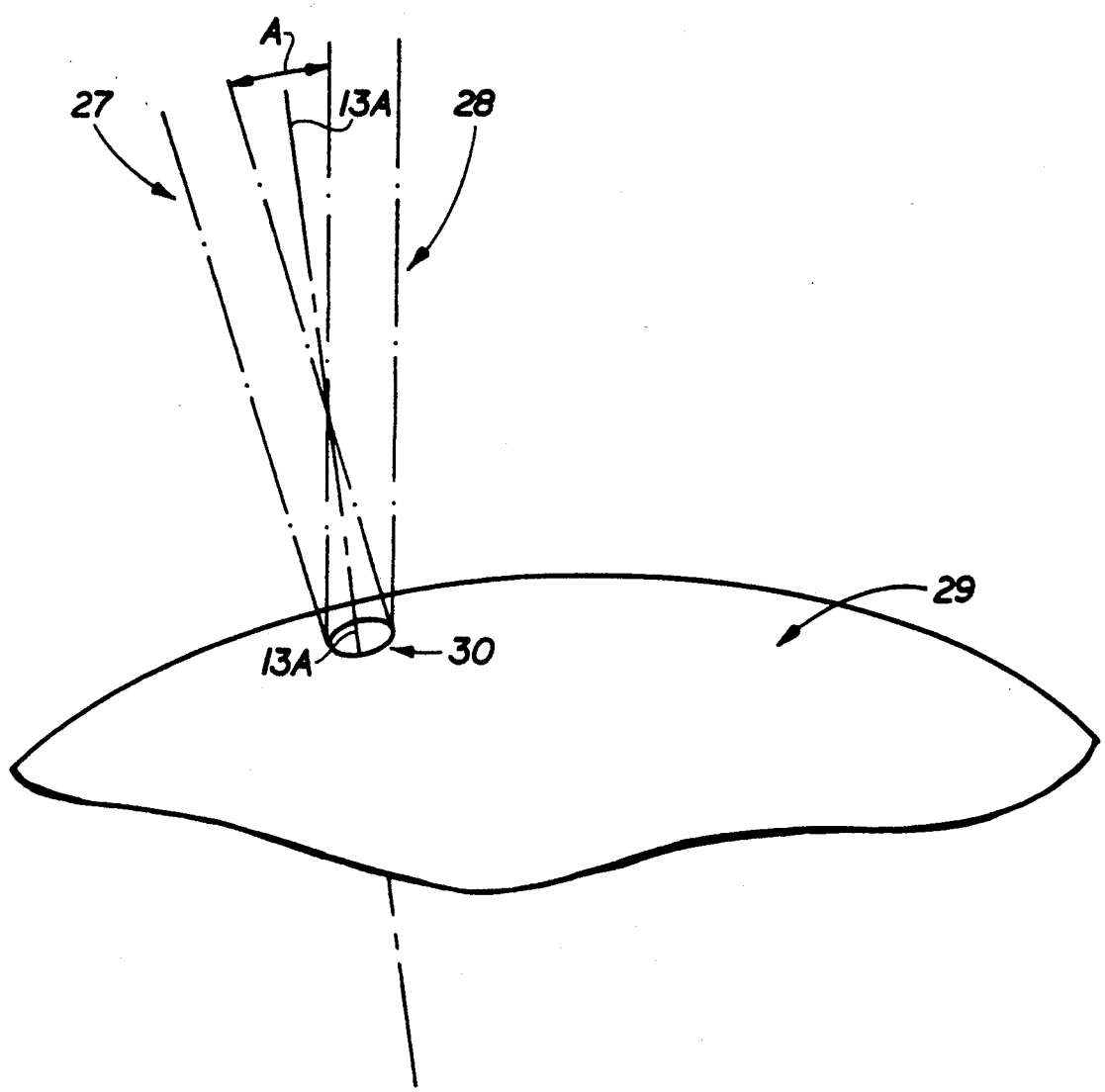

An alternate embodiment of the invention is illustrated in FIG. 6 and includes the dish 10 which receives solar energy 11 and reflects the solar energy 12 toward member 16A positioned in the focal area of arcuate concave surface 26. The small reflector members or surfaces 16 on member 16A include first and second reflector members or surfaces which receive light 12 from surface 26 and collimate and reflect beams of light in directions of travel indicated by arrows 27 and 28, respectively. The collimated light beams traveling in the directions indicated by arrows 27, 28 move and diverge toward a selected target area 30 (FIG. 7) on the surface of the earth 29. As shown in FIG. 7, the collimated beam of light 27 from the first reflector member on member 16A is at an angle A from the collimated beam of light 28 from the second reflector member on member 16A such that beams 27 and 28 each diverge from member 16a toward imaginary axis 13A and target area 30 and, when beams 27 and 28 reach the target area, each fill the target area and superimpose on one another. The angle A in FIG. 7 is, for sake of illustration, obviously greatly exaggerated in comparison to the normal magnitude of angle A.

Light which travels to a selected area 30 on the surface of the earth 29 from the space station of FIG. 1 or FIG. 6, as the case may be, is received by a solar energy collection device. The solar energy collection device can comprise a black panel which converts the light to heat, can comprise a solar cell which converts the light to electricity, or can comprise any other device which converts the energy in the light to some other desired form of energy or which further concentrates, processes, or directs the light prior to its conversion to another form of energy or prior to the light's being used for some other purpose.

The space stations of FIGS. 1 and 6 are preferably launched into geosynchronous orbit so as to be in constant view of the target area on the surface of the earth. The stations can be positioned in any other desired orbit or location in space. The stations can be provided with rockets and other means which permit the orientation and position of the stations with respect to the earth to be altered.

Having described my invention in such detail as to enable those of skill in the art to understand it, and having described the presently preferred embodiments thereof, I claim:

1. A system for collecting solar energy from outer space including
    (a) a satellite including
        (i) a concave arcuate surface for receiving and reflecting solar light in converging paths of travel toward a focal area, and
        (ii) means for receiving said reflected solar light from said concave arcuate surface and directing said solar light toward the surface of the earth, said means including a secondary reflective surface to receive said reflected solar light from said concave arcuate surface, said secondary reflective surface including a plurality of reflective members, each of said reflective members being shaped and dimensioned and positioned on said secondary reflective surface such that a separate portion of said reflected solar light strikes each of said reflective members, is collimated in a beam, and is directed along a different optical path to a common illumination area on the earth's surface
    such that beam of collimated light from said secondary reflective surface is at least partially superimposed in said illumination area on the other beams when the beams reach the surface of the earth; and,
    (b) collector means in said illumination area for receiving the beams from said satellite.

2. A system for collecting solar energy from outer space including
    (a) a satellite including
        (i) a concave arcuate surface for receiving and reflecting solar light in converging paths of travel toward a focal area, and
        (ii) means for receiving said reflected solar light from said concave arcuate surface and directing said solar light toward the surface of the earth, said means including a secondary member to receive said reflected solar light from said concave arcuate surface, said secondary member including a plurality of collimating lens, each of said lens being shaped and dimensioned and positioned on said secondary member such that a separate portion of said reflected solar light strikes each of said lens, is collimated in a beam, and is directed along a different optical path toward a common illumination area on the earth's surface such that each of the beams of collimated light from said secondary member is at least partially superimposed in said illumination area on the other beams when the beams reach the surface of the earth; and,
    (b) collector means in said illumination area for receiving the beams from said satellite.

* * * * *